Figure 1:
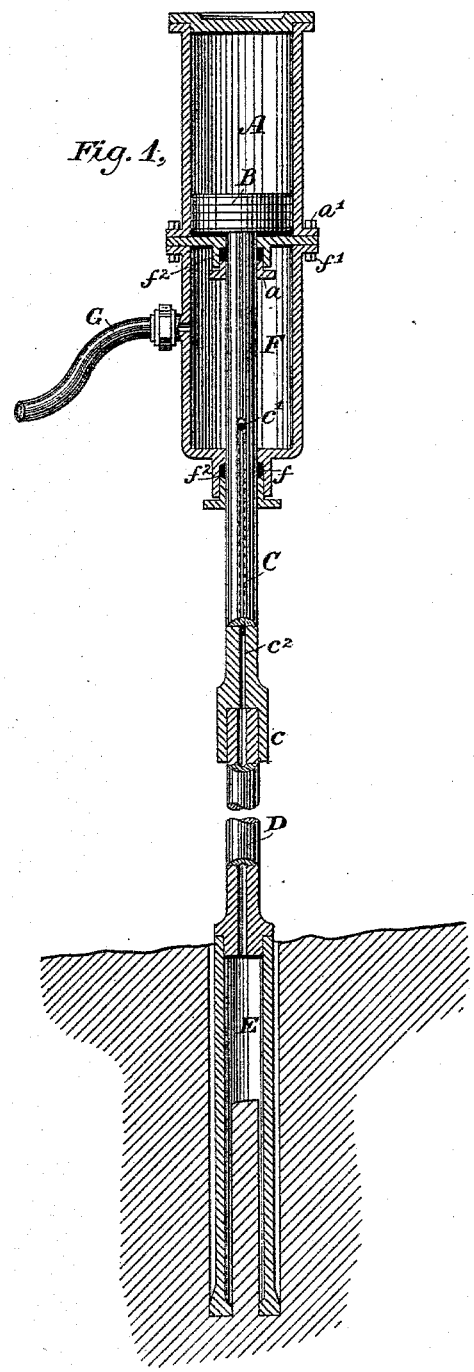

(No Model.)

G. McC. DERBY.
ROCK DRILL.

No. 296,681. Patented Apr. 8, 1884.

WITNESSES
Wm A. Skinkle
A Hamilton Morris.

INVENTOR
George McC. Derby,
By his Attorneys
Pope Edgcomb & Butler ically increased
UNITED STATES PATENT OFFICE.

GEORGE McC. DERBY, OF ASTORIA, NEW YORK.

ROCK-DRILL.

SPECIFICATION forming part of Letters Patent No. 296,681, dated April 8, 1884.

Application filed June 20, 1883. (No model.)

*To all whom it may concern:*

Be it known that I, GEORGE MCCLELLAN DERBY, a citizen of the United States, and a resident of Astoria, in the county of Queens and State of New York, have invented certain new and useful Improvements in Rock-Drills, of which the following is a specification.

My invention belongs to that class of drill denominated "tubular," in which the bit or cutting-edge of the drill is formed upon or attached to the end of a tubular steel, and by the action of which an annular section of the rock operated upon is cut away. The advantage of this class is that the labor that would be expended in pulverizing the interior is saved. It belongs also to the class known as "reciprocating," which are operated upon the principle of the steam-hammer. These have their shank connected to a piston working in a cylinder. Steam or compressed air being admitted alternately before and behind the piston forces it rapidly to and fro, causing the drill to strike the rock with great rapidity and force. The advantage of the reciprocating drill, besides the rapidity of its operation, is that it can be used to drill a hole at any angle to the vertical.

Heretofore, so far as my knowledge extends, it had not been found practicable to operate a tubular drill with this class of machine, but only drills having a solid steel and bit have been so worked. The diamond drill is tubular, but is worked only by a constant revolution about the axis of the tube, and scratches away the rock without striking. A tubular bit has also been used on that class of reciprocating rock-drills in which the motion is not positive, the power being only applied to the under side of the piston to lift the drill, which does its work simply by the action of gravity. The very slow rate of motion of machines of this class, together with the large diameter of the holes they are generally used for, make it quite easy to operate with them a bit that could not be worked at all on the class of machines to which my invention applies. The practical difficulties to be overcome in using a tubular bit on the machine with positive reciprocating motion are, first, to dispose of the core formed; and, second, to prevent the clogging of the drill by the accumulation of débris in the hole. These difficulties are largely increased by the very high rate of speed at which these machines are run and the small diameter of the holes that it is customary to drill with them.

The object of this invention is to overcome these difficulties, and to provide means by which a tube may be employed for drilling holes under the influence of a rapid to-and-fro motion imparted by such machinery, as has heretofore been used for thus driving solid steels, thus uniting the advantages of both classes.

The invention consists in pitching up the end or bit of the drill and shaping the cutting-edges in such a manner as to rapidly break the rock and to prevent clogging, either on the outside or inside of the tubular-shank steel.

It consists, also, in forcing through said bit a stream of water, air, or steam, to remove the broken material from the bit, soften the rock, and preserve the temper of the drill.

Figure 2:
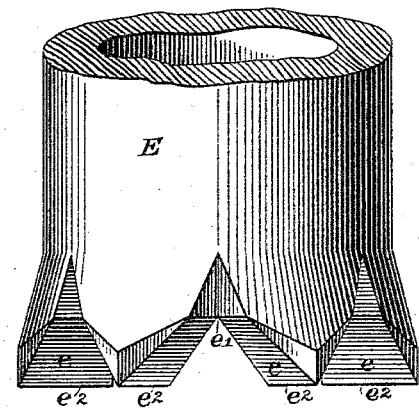
Figure 3:
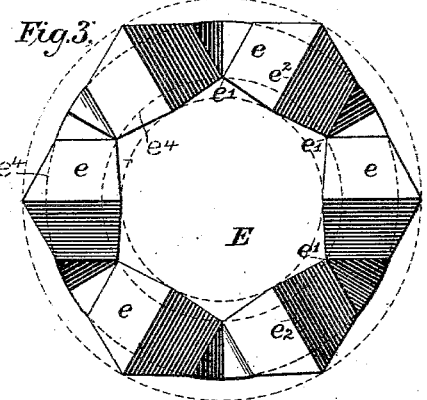
Figure 4:
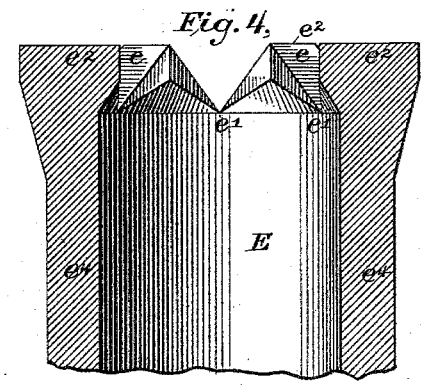

In the accompanying drawings, Figure 1 is a vertical section of a tubular drill embodying the invention, together with a device for communicating reciprocating motion thereto and supplying water or other fluid to the bit of the drill. Figs. 2, 3, and 4 are respectively an elevation, an end view, and a vertical section, of the bit of the drill.

Referring to the drawings, A represents a steam-cylinder of any suitable construction, and B a piston arranged to be driven alternately forward and back within the cylinder, in a manner well understood. Affixed to the piston B, and moving therewith, is a tubular piston-rod, C. At its outer extremity a suitable clamp, $c$, is formed for receiving the extremity of the drill-shank D, and to the other extremity of the shank D is secured in any suitable manner the tubular drill E, hereinafter described. The shaft D is also tubular, its perforation communicating at one extremity directly with that of the rod C, and at the other extremity with the interior of the tubular drill E. Surrounding the rod C, at its upper extremity, is a cylindrical air or fluid chamber, F, with which communicates an inlet-tube, G, for supplying air, steam, or water from any suitable reservoir, and under any desired amount of pressure. Suitable packing-boxes, $a$ and $f$, surround the piston-rod C at the points where it passes through the heads of the cylinders A and F. Suitable packing, $f^2$, is also provided, and the two cylinders are firmly united by means of pressure-screws $a'$ and $f'$. A transverse aperture, $c'$, leads from the exterior of the piston-rod C, at a point within the air or fluid chamber F, into the center of the same, and communicates with the longitudinal perforation $c^2$. The aperture $c'$ is at all times within the cylinder F, and through it the fluid is forced continuously into the interior of the drill. The continual flow of air or solvents therethrough serves both to force the powdered rock away from the bit of the drill, and thus from the hole as it is being formed, thereby obviating the difficulties arising from the clogging of the drill, and to prevent the drill from becoming overheated, and its temper thereby destroyed. There are two radical advantages in using a stream of air or steam rather than a stream of water, which are, first, that the former must always be at hand whenever the machine is worked, as the exhaust of the machine is always available; secondly, that a very considerable amount of work is expended in overcoming the resistance of the water in the hole to the rapid motion of the drill-rod.

To provide clearance and keep the drill from being clogged by the accumulation of débris about its extremity near the bit, either upon the inside or outside, the cutting-edge of the drill is made wider than the steel immediately above it, being constructed substantially in the manner shown in Figs. 2, 3, and 4. This construction consists in forming the face of the bit transversely serrate, as shown in Fig. 2, and at the same time swelling or expanding it upon its inner and outer edges. By rendering the cutting-edge serrate it will rapidly pulverize the rock against which it is driven, and by constructing the cutting-edges wider than the steel, the dimensions of the hole formed will be sufficient to permit the drill to be reciprocated without undue friction, and the size of the core of rock cut by the inner edge of the drill will be such as to extend within the same without in any manner interfering with the motion of the drill.

For the purpose of conveniently obtaining the required expansion of the face of the drill, it is preferred to form any convenient number of transverse wedge-shaped teeth, $e$, around the extremity of the drill. The inner edges of the adjacent teeth meet each other at their respective bases, as shown at $e'$, and the surplus metal obtained by forming the triangular openings between the same is thrown out upon each lateral surface of the teeth, thus causing the face $e^2$ of each tooth to be of greater width than its base.

A drill constructed in accordance with this invention will have a polygonal form when viewed endwise, as in Fig. 3, which shows the outline to be a regular figure, having as many sides as there are teeth to the drill.

It is not necessary that the teeth be of the exact form shown in the figure, for they may be slightly modified without departing from the principles of this invention, as by having a U-shaped or other shaped instead of V-shaped space between adjacent teeth, the idea being simply that when the cutting-edges of the bit rest on the bottom of the hole there shall be a clear and uninterrupted communication between the inside of the tubular bit and the vacant space between the drill-rod and the sides of the hole.

The form given to the face of the drill in carrying out my invention will depend both upon the size of the hole to be made and the material to be operated upon. If a large hole is to be made, it is important to have the core remain unbroken, so that it can be removed in as large pieces or sections as possible, thereby saving the power that would be necessary to pulverize it; or, if the rock operated upon is very hard, then it again becomes important to leave the core unbroken. To do this it is necessary that the teeth of the drill be pitched up on both the inside and outside, as represented in Fig. 3—that is, the face of the teeth should extend beyond the surface of the tubular steel both on the inside and on the outside. In such cases the tubular steel must be nearly as long as the distance the machine feeds. On the other hand, if the hole to be drilled is small, or if the rock is soft and easily pulverized, it is not always necessary to pitch up the inside of the teeth in this manner, the pitching up of the outside being sufficient. The drill then by its action breaks off the core in small sections and soon pulverizes it, the débris of which is carried away with the rest.

It will be seen that the triangular space between the teeth provides abundant clearance for the escape of the débris. The expansion of the steel commences as near the base of the teeth as is expedient for combining the requisite enlargement and strength.

This application forms a division of the application for which Letters Patent were granted me May 29, 1883, No. 278,517.

I claim as my invention—

The combination, with the tubular rock-drill, of a tubular shank to which said drill is attached, mechanism for communicating a positive to-and-fro motion to said drill, and means for forcing a stream of air, steam, or water through said drill, its tubular support, and bit.

In testimony whereof I have hereunto subscribed my name this 16th day of June, A. D. 1883.

GEO. McC. DERBY.

Witnesses:
DANIEL W. EDGECOMB,
CARRIE E. DAVIDSON.